United States Patent [19]
Wacyk et al.

[11] Patent Number: 5,742,134
[45] Date of Patent: Apr. 21, 1998

[54] INVERTER DRIVING SCHEME

[75] Inventors: Ihor T. Wacyk, Briarcliff Manor, N.Y.; Demetri J. Giannopoulos, Norwalk, Conn.

[73] Assignee: Philips Electronics North America Corp., New York, N.Y.

[21] Appl. No.: 642,688

[22] Filed: May 3, 1996

[51] Int. Cl.⁶ ........................................ G05F 1/00
[52] U.S. Cl. ................ 315/307; 315/219; 315/224; 315/209 R; 315/DIG. 4
[58] Field of Search .................. 315/307, 224, 315/219, 209 R, 247, 194, DIG. 4; 363/98, 17

[56] References Cited

U.S. PATENT DOCUMENTS

| | | | |
|---|---|---|---|
| 4,952,849 | 8/1990 | Fellows et al. | 315/307 |
| 4,958,108 | 9/1990 | Jorgensen | 315/307 |
| 5,030,887 | 7/1991 | Guisinger | 315/158 |
| 5,173,643 | 12/1992 | Sullivan et al. | 315/276 |
| 5,187,414 | 2/1993 | Fellows et al. | 315/307 |
| 5,204,587 | 4/1993 | Mortimer et al. | 315/308 |
| 5,373,435 | 12/1994 | Jayaraman et al. | 363/98 |
| 5,550,437 | 8/1996 | Hopkins et al. | 315/209 R |
| 5,550,438 | 8/1996 | Reijnaerts | 315/219 |
| 5,559,395 | 9/1996 | Venkitasubrahmanian et al. | 315/247 |
| 5,559,396 | 9/1996 | Bruning et al. | 315/291 |

FOREIGN PATENT DOCUMENTS

| | | |
|---|---|---|
| 0338109B1 | 10/1989 | European Pat. Off. |
| 0482705A2 | 4/1992 | European Pat. Off. |

*Primary Examiner*—Robert Pascal
*Assistant Examiner*—Haissa Philogene
*Attorney, Agent, or Firm*—Edward Blocker

[57] ABSTRACT

An inverter for powering a lamp at deep dim levels. Inverter driving circuitry includes a feedback loop which compares desired dim level to signal representing actual lamp power consumption. Reproducibility of desired lighting conditions for different types of lamps powered by the same ballast over a wide range of temperatures is also provided.

15 Claims, 5 Drawing Sheets

INVERTER DRIVING SCHEME

BACKGROUND OF THE INVENTION

This invention relates generally to an inverter driving scheme for a lamp ballast, and more particularly to an inverter driving scheme for regulating the power delivered to a lamp at low dim levels.

A conventional electronic ballast includes both an input stage and an output stage. The input stage provides a D.C. source of power for the output stage through conversion of an A.C. signal, obtained from a power line, to a D.C. signal. The output stage, which can be of the half bridge inverter type, drives a lamp. Control circuitry, such as disclosed within U.S. Pat. No. 4,952,849, in response to an external dim control signal representing a desired level of illumination, can provide linear control of lamp power between about 20% and 100% of full lamp power. The linear relationship between the external dim control signal and lamp power provided by such control circuitry cannot be maintained below about 15% of full lamp power.

The control circuitry, as disclosed within U.S. Pat. No. 4,952,849, controls lamp power based on a weighted sum of lamp current and lamp voltage. At below about 15% of full lamp power, light output is not linearly proportional to lamp current. Such nonlinearity makes it difficult to regulate lamp power at deep dim light levels (e.g. as low as about 1% to 3% of full light output).

A conventional ballast also powers different types of lamps at dramatically different levels of light output. These differences in light output result from the different types of lamps operating at significantly different current and voltage levels. Reproducibility of desired lighting conditions for different types of lamps powered by the same ballast is problematic.

It is therefore desirable to provide an improved lamp ballast in which regulation is available for light levels as low as about 1% to 3% of full light output. Preferably, regulation at such deep dim light levels should be provided through a linear relationship between the external dim control signal and lamp power. The improved lamp ballast should also power different types of lamps at substantially the same level of light output, that is, provide reproducibility of desired lighting conditions for different types of lamps.

SUMMARY OF THE INVENTION

Generally speaking, in accordance with the invention, an inverter for powering a load having a lamp includes switching circuitry responsive to driving signals for switching into conductive and nonconductive states whereby power is delivered to the load such that a voltage is applied to and current flows through the lamp. The inverter also includes control circuitry for producing the driving signals based on a lamp power signal. A multiplier within the control circuitry generates the lamp power signal which is proportional to the product of lamp current and lamp voltage.

The lamp power signal produced by the multiplier is substantially proportional to light output, that is, light output is substantially proportional to the product of lamp current and lamp voltage regardless of the level to which the lamp is dimmed. The difficulty in regulating light output by employing a scheme involving the weighted sum of lamp voltage and lamp current, as used in U.S. Pat. No. 4,952,849, is overcome by relying on the linear relationship between light output and the product of lamp current and lamp voltage throughout the range of illumination desired. Regulation at deep dim light levels to as low as about 1% to 3% of full light output can be easily attained. Substantially no differences in light output exist from different types of lamps operating at significantly different current and voltage levels. Reproducibility of desired lighting conditions for different types of lamps powered by the same ballast is achieved by producing driving signals for the switching circuitry of the inverter which is based on the power consumed by each lamp, that is, by the product of lamp current and lamp voltage.

It is a feature of the invention that the control circuitry further include an amplifier for comparing a feedback voltage based on the lamp power signal to a varying voltage representing a desired level of power for by the lamp within a range from a minimum dim level to maximum brightness at full lamp power. It is another feature of the invention that the feedback voltage reflects the combination of the lamp power signal and a D.C. offset The D.C. offset is a fixed value based on the minimum level of power desired by the lamp.

The control circuitry is generally formed on an integrated circuit. A serial combination of a D.C. voltage source and resistive voltage divider network external to the integrated circuit establishes the level of the D.C. offset. The serial combination is coupled through a pin of the integrated circuit to the multiplier with the voltage at the pin serving as the feedback voltage.

It is another feature of the invention that only one or more linear relationships exist both between the varying voltage throughout the range of illumination and the lamp power signal and between the lamp power signal and power consumed by the lamp. Only one or more linear relationships will result between the varying voltage throughout the range of illumination and power consumed by the lamp.

In accordance with another aspect of the invention, a method of controlling the power delivered by an inverter to a load having a lamp includes switching a pair of transistors configured in a totem pole arrangement into conductive and nonconductive states in response to driving signals whereby power is delivered to the load such that a voltage is applied to and current flows through the lamp. The method also includes producing the driving signals based on a lamp power signal generated by a multiplier. The lamp power signal is proportional to the product of lamp current and lamp voltage.

The method can also include comparing a feedback voltage based on the lamp power signal to a varying voltage representing a desired level of power for the lamp within a range from a minimum dim level to maximum brightness at full lamp power. When the feedback voltage reflects the combination of the lamp power signal and a D.C. offset, the method can further include fixing a predetermined value to the D.C. offset based on the minimum level of power desired for the lamp. Generally, the multiplier is formed on an integrated circuit such that by coupling the D.C. offset through a pin of the integrated circuit to the multiplier the voltage at the pin can serve as the feedback voltage.

It is another feature of this aspect of the invention that the method further include establishing only one or more linear relationships both between the varying voltage throughout the range and the lamp power signal and between the lamp power signal and power consumed by the lamp. One or more linear relationships will therefore exist between the varying voltage throughout the range and power consumed by the lamp.

Accordingly, it is an object of the invention to provide an improved inverter driving circuit for a lamp ballast in which regulation is available for light levels as low as about 1% to 3% of full light output.

It is another object of the invention to provide an improved inverter driving circuit for a lamp ballast in which regulation at deep dim light levels is provided based on a substantially linear relationship between an external dim control signal and lamp power.

It is a further object of the invention to provide an improved inverter driving circuit for a lamp ballast which powers different types of lamps at substantially the same level of light output.

Still other objects and advantages of the invention, will, in part, be obvious and will, in part, be apparent from the specification.

The invention accordingly comprises several steps in a relation of one or more of such steps with respect to each of the others, and the device embodying features of construction, a combination of elements and arrangement of parts which are adapted to effect such steps, all is exemplified in the following detailed disclosure and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
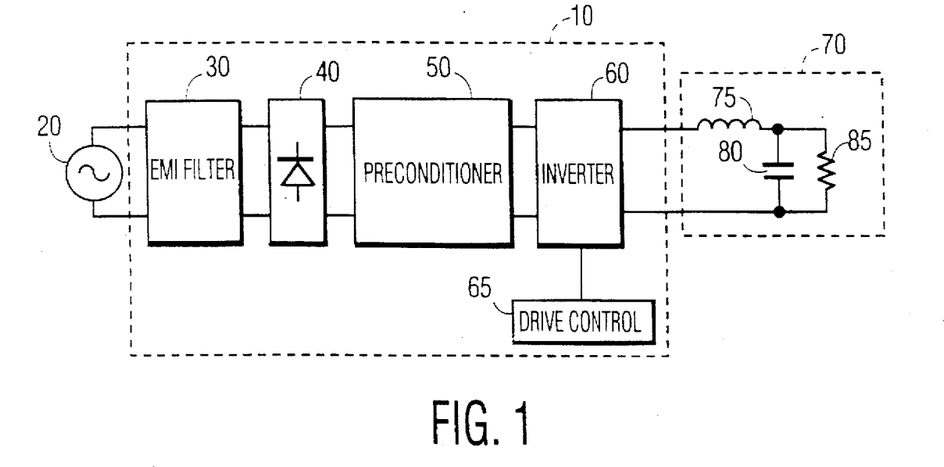
FIG. 1 is a block diagram illustrating a ballast in accordance with the invention.

As shown in FIG. 1, a ballast 10 is supplied from an A.C. power line represented by an A.C. source 20. Ballast 10 includes an EMI filter 30, a full wave diode bridge 40, a preconditioner 50, an inverter 60 and a drive control circuit 65. The output of inverter 60, which serves as the output for ballast 10, is connected to a load 70 including an inductor 75 serially connected to the parallel combination of a capacitor 80 and a fluorescent lamp 85. EMI filter 30 removes harmonics generated by preconditioner 50 and inverter 60. Diode bridge 40 rectifies the filtered sinusoidal voltage resulting in a D.C. voltage with ripple. Preconditioner 50 serves several functions. The rectified peak A.C. voltage outputted from diode bridge 40 is both boosted and made into a substantially constant D.C. voltage supplied to inverter 60. Preconditioner 50 also improves the overall power factor of ballast 10. For example, 120, 220 and 277 RMS voltages applied to EMI filter 30 by A.C. source 20 result in D.C. voltages of approximately 250, 410 and 490 volts being supplied to inverter 60, respectively.

Inverter 60, which is driven by drive control circuit 65 during full arc discharge of lamp 85 at a switching frequency of about 45 kilohertz (kHz), converts the D.C. voltage into a square wave voltage waveform applied to load 70. The lamp illumination level can be increased and decreased by decreasing and increasing the frequency of this square wave voltage waveform, respectively.

Figure 2:
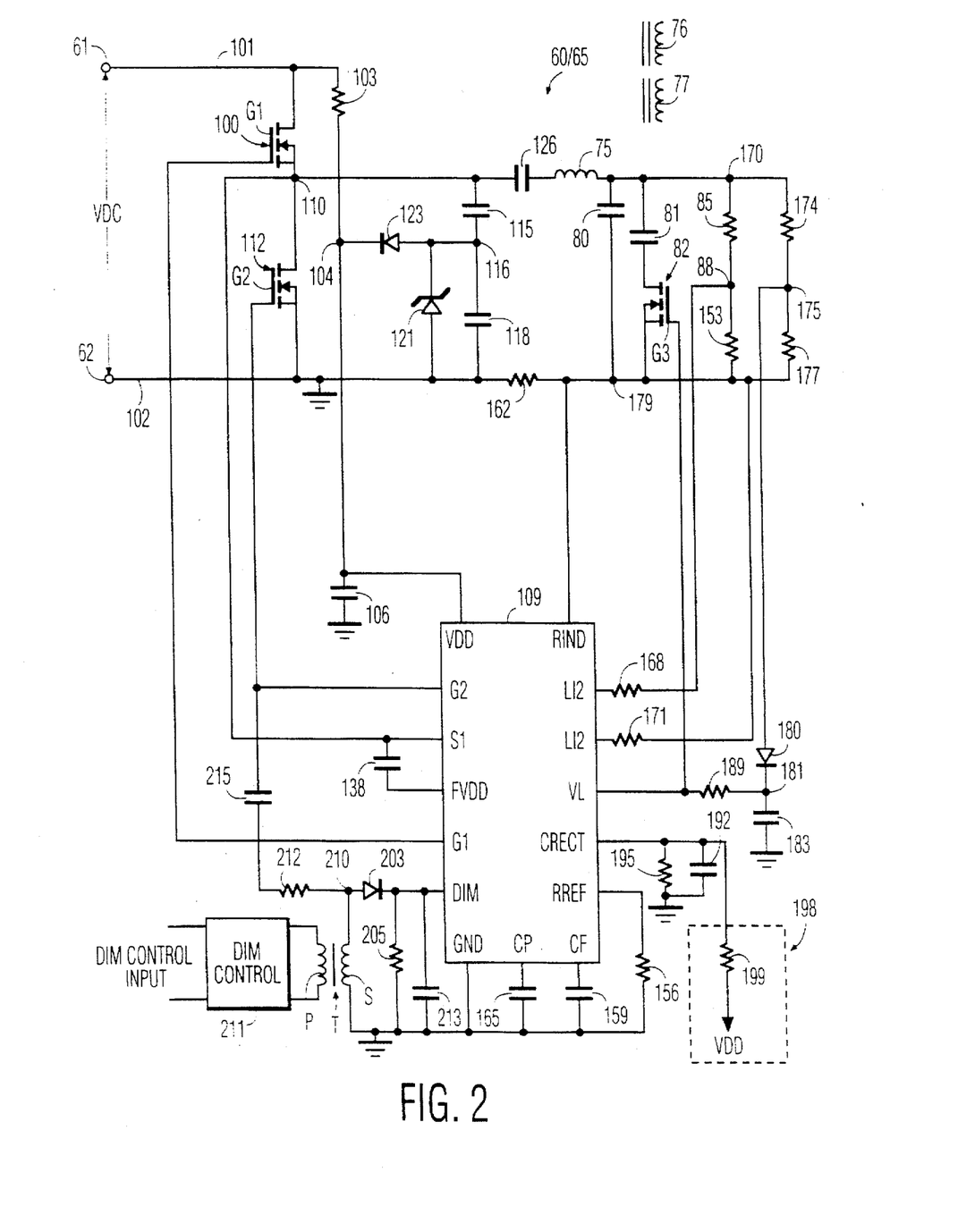
FIG. 2 is a schematic of an inverter and associated drive control circuit in accordance with the invention.

Inverter 60 and drive control circuit 65 are shown in greater detail in FIG. 2. A substantially constant voltage VDC provided by preconditioner 50 is supplied to inverter 60 across a pair of input terminals 61 and 62 of the latter. Inverter 60 is configured as a half-bridge and includes a B+ (rail) bus 101, a grounded return bus 102 and a pair of switches (e.g. power MOSFETs) 100 and 112 which are serially connected between bus 101 and bus 102. Switches 100 and 112 are joined together at a junction 110 and commonly identified as forming a totem pole arrangement. The MOSFETs serving as switches 100 and 112 have a pair of gates G1 and G2, respectively. Buses 101 and 102 are connected to input terminals 61 and 62, respectively. A resistor 103 and a capacitor 106 are joined together at a junction 104 and serially connected between bus 101 and bus 102. A pair of capacitors 115 and 118 are joined together at a junction 116 and serially connected between junction 110 and bus 102. A zener diode 121 and a diode 123 are joined together at junction 116 and serially connected between junction 104 and bus 102.

Inductor 75, capacitor 80, a capacitor 81, lamp 85 and a resistor 174 are joined together at a junction 170. A pair of windings 76 and 77 are coupled to winding 75 for application of voltages across the filaments (not shown) of lamp 85 in conditioning the latter during the preheat operation. A D.C. blocking capacitor 126 and inductor 75 are serially connected between junctions 110 and 170. Capacitor 80 and a pair of resistors 153 and 177 are connected together at a junction 179. Lamp 85 and resistor 153 are joined together at a junction 88 and serially connected between junctions 170 and 179. Resistors 174 and 177 are joined together at a junction 175 and serially connected between junctions 170 and 179. Capacitor 81 and a switch (e.g. MOSFET) 82 are serially connected between junctions 170 and 179. A resistor 162 is connected between bus 102 and junction 179. A diode 180 and a capacitor 183 are joined together at a junction 181 and are serially connected between junction 175 and ground.

An integrated circuit (IC) 109 includes a plurality of pins. A pin RIND is connected to junction 179. The input voltage at pin RIND reflects (a representative sample) the level of current flowing through inductor 75. A pin VDD, which is connected to junction 104, supplies the voltage for driving IC 109. A pin LI2 is connected through a resistor 168 to junction 88. A pin LI1 is connected through a resistor 171 to junction 179. The difference between the currents inputted to pins LI1 and LI2 reflects the sensed current flowing through lamp 85. The voltage at a pin VL, which is connected through a resistor 189 to junction 181, reflects the peak voltage of lamp 85. The voltage at the VL pin, which is also applied to a gate G3 of switch 82, controls when capacitor 81 is placed in parallel with capacitor 80. The current flowing out of a CRECT pin into ground through a parallel combination of a resistor 195 and a capacitor 192 reflects the average power of lamp 85 (i.e. the product of lamp current and lamp voltage). An optional external D.C. offset 198, explained in greater detail below, includes a serial combination of VDD and a resistor 199 which results in a D.C. offset current flowing to ground through of resistor 195.

Capacitor 192 serves to provide a filtered D.C. voltage across resistor 195. A resistor 156 is connected between a pin RREF and ground and serves to set the reference current within IC 109. A capacitor 159, which is connected between a CF pin and ground, sets the frequency of a current controlled oscillator (CCO) discussed in greater detail below. A capacitor 165, which is connected between a CP pin and ground, is employed for timing of both the preheat cycle and the nonoscillating/standby mode as discussed below. A GND pin is connected directly to ground. A pair of pins G1 and G2 are connected directly to gates G1 and G2 of switches 100 and 112, respectively. A pin S1, which is connected directly to junction 110, represents the voltage at the source of switch 100 A pin FVDD is connected to junction 110 through a capacitor 138 and represents the floating supply voltage for IC 109. Pin G2 is connected to a DIM pin through the serial combination of a capacitor 215, a resistor 212 and a diode 203. A resistor 206 and a capacitor 213 are connected between the DIM pin and ground. A secondary winding of a transformer T is connected between a junction 210, which joins resistor 212 to diode 203, and ground. A dim control circuit 211 is connected across a primary winding of transformer T. The voltage applied to the DIM pin reflects the level of illumination as set by dim control circuit 211.

Operation of inverter 60 and drive control circuit 65 is as follows. Initially (i.e. during startup), as capacitor 106 is charged based on the RC time constant of resistor 103 and capacitor 106, switches 100 and 112 are in nonconducting and conducting states, respectively. The input current flowing into pin VDD of IC 109 is maintained at a low level (less than 500 microamp) during this startup phase. Capacitor 138, which is connected between junction 110 and pin FVDD, charges to a relatively constant voltage equal to approximately VDD and serves as the voltage supply for the drive circuit of switch 100. When the voltage across cap 106 exceeds a voltage turnon threshold (e.g. 12 volts), IC 109 enters its operating (oscillating/switching) state with switches 100 and 112 each switching back and forth between their conducting and nonconducting states at a frequency well above the resonant frequency determined by inductor 75 and capacitor 80.

IC 109 initially enters a preheat cycle (i.e. preheat state) once inverter 60 begins oscillating. Junction 110 varies between about 0 volts and VDC depending on the switching states of switches 100 and 112. Capacitors 115 and 118 serve to slow down the rate of rise and fall of voltage at junction 110 thereby reducing switching losses and the level of EMI generated by inverter 60. Zener diode 121 establishes a pulsating voltage at junction 116 which is applied to capacitor 106 by diode 123. A relatively large operating current of, for example, 10–15 milliamps supplied to pin VDD of IC 109 results. Capacitor 126 serves to block the D.C. voltage component from being applied to lamp 85. Pin VL is at a high logic level which turns on switch 82. Capacitor 81 is now placed in parallel with capacitor 80. Inductor 75 and the parallel combination of capacitors 80 and 81 form a resonant circuit.

During the preheat cycle lamp 85 is in a nonignited state, that is, no arc has been established within lamp 85. The initial operating frequency of IC 109, which is about 100 kHz, is set by resistor 156 and capacitor 159 and the reverse diode conducting times of switches 100 and 112. IC 109 immediately reduces the operating frequency at a rate set internal to the IC. The reduction in frequency continues until the peak voltage across resistor 162 as sensed at the RIND pin is equal to −0.4 volts (i.e. the negative peak voltage equal to 0.4 volts). The switching frequency of switches 100 and 112 is regulated so as to maintain the sensed voltage by the RIND pin equal to −0.4 volts which results in a relative constant frequency of about 80–85 kHz (defined as the preheat frequency) at junction 110. A relatively constant RMS current flows through inductor 75 which through coupling to windings 76 and 77 permits the filaments (i.e. cathodes) of lamp 85 to be sufficiently preconditioned for subsequent ignition of lamp 85 and to maintain long lamp life. The duration of the preheat cycle is set by capacitor 165. When the value of capacitor 165 is zero (i.e. open), there is effectively no preheating of the filaments resulting in an instant start operation of lamp 85.

At the end of the preheat operation, as determined by capacitor 165, pin VL assumes a low logic level turning off switch 82. Capacitor 81 is no longer connected in parallel to capacitor 80. IC 109 now starts sweeping down from its switching frequency at preheat at a rate set internal to IC 109 toward an unloaded resonant frequency (i.e. resonant frequency of inductor 75 and capacitor 80 prior to ignition of lamp 85-e.g. 60 kHz). As the switching frequency approaches the resonant frequency, the voltage across lamp 85 rises rapidly (e.g. 600–800 volts peak) and is generally sufficient to ignite lamp 85. Once lamp 85 is lit, the current flowing therethrough rises from a few milliamps to several hundred milliamps. The current flowing through resistor 153, which is equal to the lamp current, is sensed at pins LI1 and LI2 based on the current differential therebetween as proportioned by resistors 168 and 171, respectively. The voltage of lamp 85, which is scaled by the voltage divider combination of resistors 174 and 177, is detected by diode 180 and capacitor 183 resulting in a D.C. voltage, proportional to the peak lamp voltage, at junction 181. The voltage at junction 181 is converted into a current by resistor 189 flowing into pin VL.

The current flowing into pin VL is multiplied inside IC 109 with the differential currents between pins LI1 and LI2 resulting in a rectified A.C. current fed out of pin CRECT into the parallel combination of capacitor 192 and resistor 195. Capacitor 192 and resistor 195 convert the A.C. rectified current into a D.C. voltage which is proportional to the power of lamp 85. The voltage at the CRECT pin is forced equal to the voltage at the DIM pin by a feedback circuit/loop contained within IC 109. Regulation of power consumed by lamp 85 results.

The desired level of illumination of lamp 85 is set by the voltage at the DIM pin. The feedback loop includes a lamp voltage sensing circuit and a lamp current sensing circuit discussed in greater detail below. The switching frequency of half-bridge inverter 60 is adjusted based on this feedback loop whereby the CRECT pin voltage is made equal to the voltage at the DIM pin. The CRECT voltage varies between 0.3 and 3.0 volts (i.e. a 1:10 ratio). Whenever the voltage at the DIM pin rises above 3.0 volts or falls below 0.3 volts, it is clamped internally to 3.0 volts or 0.3 volts, respectively. The voltage at the DIM pin is a D.C. voltage. A dim control input of 1–10 volts applied to DIM control circuit 211 is converted by the combination of transformer T, resistors 206 and 212, diode 203 and capacitors 213 and 215 into a 0.3–3.0 volt signal applied to the DIM pin. Transformer T provides galvanic isolation of the D.C. control input signal from the high voltages within inverter 60. The signal provided at the DIM pin can be generated through different methods including, for example, phase angle dimming in which a portion of the phase of the A.C. input line voltage is cut off These methods convert the cutoff phase angle of the input line voltage into a D.C. signal applied to the DIM pin.

The voltage at the CRECT pin is zero when lamp 85 ignites. As lamp current builds up, the current generated at the CRECT pin, which is proportional to the product of lamp voltage and lamp current, charges capacitor 192. The switching frequency of inverter 60 decreases or increases until the voltage at the CRECT pin is equal to the voltage at the DIM pin. When the dim level is set to full (100%) light output, capacitor 192 is permitted to charge to 3.0 volts and therefore the CRECT pin voltage rises to 3.0 volts based on the feedback loop. During the rise in voltage, the feedback loop, discussed in greater detail below, is open. Once the CRECT pin voltage is at about 3.0 volts, the feedback loop closes. Similarly, when the dim level is set to minimum light output, capacitor 192 is permitted to charge to 0.3 volts and therefore the CRECT pin voltage rises to 0.3 volts based on the feedback loop. Generally, 0.3 volts at the DIM pin corresponds to 10% of full light output. For deep dimming down to 1% of full light output, external offset 198, which is otherwise not required can be employed such that 0.3 volts at the DIM pin corresponds to 1% of full light output. When the dim level is set to the minimum light output, the CRECT capacitor charges to 0.3 volts before the feedback loop closes.

Conventional lamps which are set to dim upon ignition typically exhibit an ignition flash. The flash of light, which is above the level of illumination desired, is produced by supplying a high level of power to the lamp for a relatively long and unnecessary period after ignition (e.g. up to a few seconds). In this way, conventional ballast ignition schemes ensure successful ignition of the lamp. In accordance with the invention, however, ignition flashes are minimized. The duration of a high light condition following ignition is very short for low dim settings and the visual impact of the undesired light flash is minimized. Substantial avoidance of ignition flashes is achieved by reducing the power level supplied to lamp 85 immediately after ignition takes place through use of the feedback loop.

Power Regulation and Dimming Control

Figure 3:
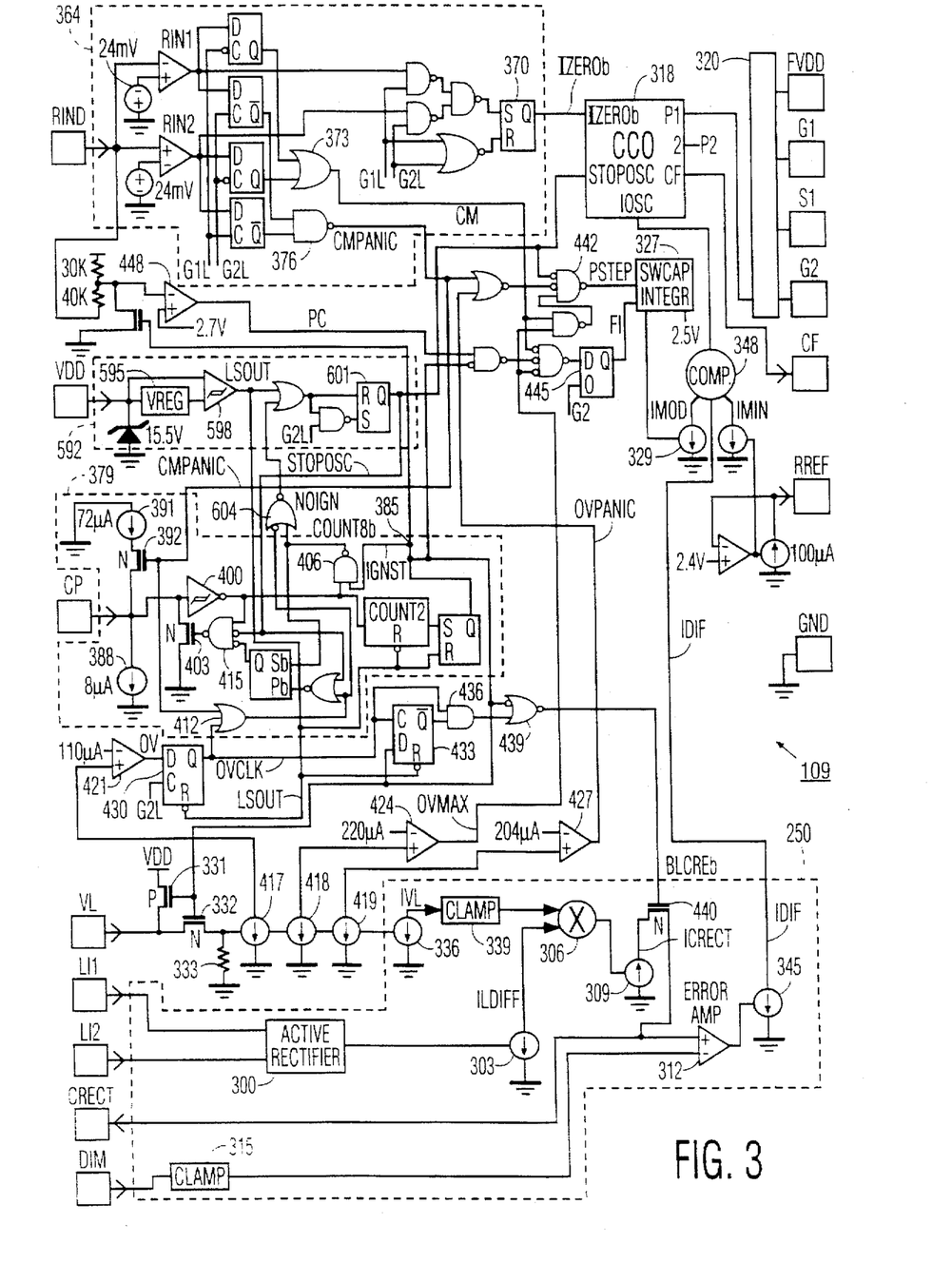
FIG. 3 is a logic block diagram of an integrated circuit which serves as the drive control circuit of FIG. 2.

Turning now to FIG. 3, IC 109 includes a power regulation and dimming control circuit 250. The differential current between pins LI1 and LI2 is supplied to an active rectifier 300. Active rectifier 300 full waves rectifies the A.C. waveform by employing an amplifier with internal feedback rather than a diode bridge to avoid any voltage drop normally associated with diodes. A current source 303 in response to the output of active rectifier 300 generates a rectified current ILDIFF representing the flow of current through lamp 85 which is supplied as one of two inputs to a current multiplier 306.

A P channel MOSFET 331 is turned on and an N-channel MOSFET 332 is turned off during preheat so as to pull the VL pin up to the voltage potential of pin VDD. At the end of preheat cycle (e.g. 1 second in duration), P channel MOSFET 331 is turned off and N channel MOSFET 332 is turned on to permit power regulation and dim control operation of inverter 60 to take place. Current following the preheat cycle flows through the VL pin and N channel MOSFET 332 and is scaled by a resistor 333. A current source (i.e. current amplifier) 336 in response to the scaled current from the VL pin produces a current signal IVL. A current clamp 339 limits the maximum level of current signal IVL which is fed into the other input of multiplier 306. A current source 309 outputs a current ICRECT in response to the output of multiplier 306 which is fed into both the CRECT pin and the noninverting input of an error amplifier 312. As shown in FIG. 2, capacitor 192 and resistor 195 converts the A.C. rectified current at the CRECT pin into a D.C. voltage.

Referring once again to FIG. 3, a D.C. voltage at the DIM pin is applied to a voltage clamp circuit 315. Voltage clamp circuit 315 limits the voltage at the CRECT pin between 0.3 and 3.0 volts. The output of voltage clamp circuit 315 is supplied to the inverting input of error amplifier 312. The output of the error amp 312 controls the level of current IDIF flowing through a current source 345. A current comparator 348 compares current IDIF with a reference current IMIN and a current IMOD and outputs the current signal of greatest magnitude. The IMOD current is controlled by a switch capacitor integrator 327. The current outputted by current comparator 348 provides a control signal which determines the oscillation (switching) frequency at which VCO 318 oscillates. When the lamp ignites, the CRECT pin voltage and IDIF current are zero. The output of the comparator 348 selects the maximum current level from among IMIN, IDIF and IMOD which is IMOD. As the CRECT pin voltage builds up to the voltage at the DIM pin, the IDIF current increases. When the IDIF current exceeds the IMOD current, the output of comparator 348 is equal to the IDIF current.

The feedback loop is centered about error amplifier 312 and includes any components internal or external to IC 109 in making the voltage at the CRECT pin equal to the voltage at the DIM pin. When the voltage at the DIM pin is below 0.3 volts, a D.C. voltage of 0.3 volts is applied to the inverting input of error amplifier 312. When the voltage at the DIM pin exceeds 3.0 volts, 3.0 volts is applied to error amplifier 312. The voltage applied to the DIM pin should range from and including 0.3 volts to and including 3.0 volts to achieve a desired ratio of 10:1 between the maximum and minimum light levels of lamp 85. Input to multiplier 306 is clamped by current clamp 339 to provide proper scaling of the current into multiplier 306.

Current Control Oscillator 318

The frequency of CCO 318 in response to the output of comparator 348 controls the switching frequency of half bridge inverter 60. Comparator 348 supplies the IMOD current to CCO 318 during preheat and ignition sweep. Comparator 348 outputs to CCO 318 the IDIF current during steady state operation. CCO 318 in response to the IMIN current when outputted by comparator 348 limits the minimum switching frequency The minimum switching frequency is also based on capacitor 159 and resistor 156 which are connected external to IC 109 at pins CF and RREF, respectively. Inverter 60 reaches closed loop operation when the CRECT pin voltage is at the same voltage as the DIM pin voltage. Error amplifier 312 adjusts the IDIF current outputted by comparator 348 so as to maintain the CRECT pin voltage about equal to the DIM pin voltage.

Resonant Inductor Current Sense Circuit

A resonant inductor current sense circuit monitors the current of the resonant inductor, as represented by the signal at the RIND pin, in determining whether inverter 60 is in or near the capacitive mode of operation. Inverter 60 is in the capacitive mode of operation when the current flowing through inductor 75 leads the voltage across switch 112. In the near capacitive mode of operation, the current flowing through inductor 75 is close to but does not yet lead the voltage across switch 112. For example, given a resonant frequency based on inductor 75 and capacitor 80 of about 50 kHz, a near capacitive mode of operation exists when the current flowing through inductor 75 lags behind but is within about 1 microsecond of the voltage across switch 112.

Circuit 364 also detects whether forward conduction or body diode conduction (from the substrate to the drain) of switch 100 or 110 takes place. A signal IZEROb produced by resonant inductor current sense circuit 364, that is, signal IZEROb produced at the Q output of a flip-flop 370 is at a high logic level when either switch 100 or 112 is in forward conduction and at a low logic level when the body diode of switch 100 or 112 conducts. Signal IZEROb is supplied to an IZEROb pin of CCO 318. When signal IZEROb is at a low logic level, the waveform at the CF pin 379 is substantially at a constant level. When signal IZEROb is at a high logic level and switch 100 is conducting, the voltage at the CF pin is rising. When signal IZEROb is at a high logic level and the switch 112 is conducting, the voltage at the CF pin is decreasing/falling.

A signal CM produced by resonant inductor current sense circuit 364, that is, signal CM produced by an OR gate 373 is at a high logic level when the switching frequency of inverter 60 is in the near capacitive mode of operation. A switch capacitor integrator 327 based on signal CM being at a high logic level will cause an increase in the output of current source 329 (i.e. IMOD current). The increase in magnitude of the IMOD current results in comparator 348 supplying the IMOD current to VCO 318 whereby an increase in the switching frequency of inverter 60 takes place. The near capacitive mode of operation is detected by resonant inductor current sense circuit 364 by monitoring the sign (+ or −) of the voltage waveform at the RIND pin during the leading (rising) edge of each gate drive pulse produced at pin G1 and G2 of IC 109. When the sign of the voltage waveform at the RIND pin during the leading edge of gate pulse G1 is + (positive) or of gate pulse G2 is − (negative), inverter 60 is in a near capacitive mode of operation.

A NAND gate 376 outputs a CMPANIC signal which is at a high logic level when inverter 60 is operating in the capacitive mode. Once the capacitive mode is detected, the level of the IMOD current rapidly rises in response to the rapid rise in the output of switch capacitor integrator 327. VCO 318 based on the IMOD signal, resistor 156 and capacitor 159 controls a relatively instantaneous rise to the maximum switching frequency of inverter 60 The capacitive mode is detected by monitoring the sign (±) of the voltage waveform at the RIND pin during the trailing (falling) edge of each gate drive pulse produced at pin G1 and G2 of IC 109. When the sign of the voltage waveform at the RIND pin during the trailing edge of gate pulse G1 is − (negative) or of gate pulse G2 is + (positive), inverter 60 is in a capacitive mode of operation.

Preheat/Ignition Stop Circuit

A circuit 379 in response to the value of capacitor 165 (connected between pin CP and ground) sets the times for preheating the filaments of lamp 85 and for placing inverter 60 into a standby mode of operation. During the preheat cycle, 2 pulses (over a 1 second duration) are generated at the CP pin. The switching frequency of inverter 60 during the preheat cycle is about 80 kHz. At the end of the preheat cycle, a signal IGNST assumes a high logic level initiating an ignition start, that is, an ignition sweep in the switching frequency from about 80 kHz to about but above the resonant frequency of inductor 75 and capacitor 85 of, for example, about 60 kHz (unloaded resonant frequency). The ignition sweep can be at a rate, for example, of 10 kHz/milliseconds.

IC 109 regulates the amplitude of current flowing through resonant inductor 75 which is sensed at the RIND pin. When the voltage magnitude at the RIND pin exceeds 0.4, a signal PC outputted by a comparator 448 assumes a high logic level causing the output of switch capacitor integrator 327 to adjust the level of the IMOD current. An increase in the RMS switching frequency results which reduces the amplitude of the current flowing through resonant inductor 75. When the voltage magnitude at the RIND pin falls below 0.4, signal PC assumes a low logic level causing the output of switch capacitor integrator 327 to adjust the level of the IMOD signal such that the switching frequency decreases. An increase in the current flowing through resonant inductor 75 results. A well regulated flow of current through resonant inductor 75 is achieved which permits a substantially constant voltage across each filament of lamp 85 during preheat. Alternatively, by including a capacitor (not shown) in series with each filament a substantially constant current flow through the filaments can be achieved during preheat.

Circuit 379 also includes an ignition timer which is initiated following elapse of the preheat cycle. Once activated, 1 pulse is generated at the CP pin. If after this pulse either a capacitive mode of inverter operation or an overvoltage condition across lamp 85 is detected, IC 109 enters a standby mode of operation. During standby, VCO 318 stops oscillating with switches 112 and 100 being maintained in conductive and nonconductive states, respectively. To exit the standby mode of operation, the supply voltage to IC 109 (i.e. supplied to pin VDD) must be reduced to at least or below a turnoff threshold (e.g. 10 volts) and then increased to at least a turnon threshold (e.g. 12 volts).

The preheat timer includes a Schmitt trigger 400 (i.e. a comparator with hysteresis) which sets the tripping points of the CP waveform. These tripping points represent the voltages applied to the input of the Schmitt trigger 400 for triggering the latter on and off. A switch 403 when in a conductive state provides a path for discharge of capacitor 165. Switch 403 is placed in a conductive state whenever and for the duration of each pulse generated by Schmitt trigger 400. Capacitor 165 discharges whenever the voltage at the CP pin exceeds the upper tripping point as established by Schmitt trigger 400. The discharge path includes the CP pin, switch 403 and ground. Capacitor 165 is charged by a current source 388. When a capacitive mode of operation is detected, as reflected by the generation of a CMPANIC signal at a NAND gate 376, a switch 392 is turned on. Capacitor 165 is now also charged by a current source 391. Current charging capacitor 165 is 10 times higher when the capacitive mode of operation is detected. The voltage at the CP pin reaches the upper tripping point of Schmitt trigger 400 in 1/10 the time it takes when not in the capacitive mode. The pulse therefore at the CP pin is 10 times shorter when the capacitive mode of operation is detected than when the capacitive mode of operation is not detected. Consequently, IC 109 will enter the standby mode of operation in a relatively short period of time whenever an increase in the switching frequency does not eliminate the capacitive mode condition.

The preheat timer also includes a D-type flip flop forming counter 397. The output of a NAND gate 406 generates a signal COUNT 8b which assumes a low logic level at the end of the ignition period. A gate 412 outputs a high logic level whenever an overvoltage minimum threshold condition (i.e. as represented by the OVCLK signal) across lamp 85 or a capacitive mode of inverter operation (i.e. as represented by signal CMPANIC) has been detected. When the output of a gate 415 assumes a high logic level, switch 403 is turned on resulting in the discharge of capacitor 165.

Overvoltage Protection

As discussed above, following the preheat cycle the input current flowing from the VL pin is fed to multiplier 306 through current source 336 for purposes of power regulation and dimming control. The input current from the VL pin also feeds the noninverting inputs of a comparator 421, 424 and 427 through a current source 417, a current source 418 and a current source 419, respectively.

Comparator 421 in response to detecting that the lamp voltage has exceeded an overvoltage minimum threshold activates the ignition timer. When the overvoltage minimum threshold condition exists following elapse of the ignition timer, IC 109 enters the standby mode of operation. A D type flip-flop 430 clocks the output of comparator 421 at the falling edge of the gate pulse produced at pin G2. The logic combination of a D-type flip-flop 433, an AND gate 436 and a NOR gate 439 cause a switch (an N-channel MOSFET) 440 to open and thereby block the ICRECT signal whenever the overvoltage minimum threshold is exceeded during the first ignition sweep. The flip-flop 433 has its D input tied to an internal node 385. The D input of flip-flop 433 assumes a high logic level at the end of the preheat cycle when an overvoltage minimum condition is detected. The output of flip-flop 433 in response to the high logic level at its D input assumes a low logic level resulting in the output of gate 439 switching to a low logic level. Switch 440 opens thereby blocking the ICRECT signal from reaching the CRECT pin. When the ICRECT signal is blocked from reaching the CRECT pin, capacitor 192 discharges through resistor 195. Full discharge occurs if external offset 198 is not used. Partial discharge occurs when offset 198 is used as shown in FIG. 2. In either event, discharge of capacitor 192 lowers the voltage at the CRECT pin to ensure that the feedback loop does not close. During the preheat cycle, the IGNST signal at internal node 385 is at a low logic level. NOR gate 439 will therefore turn off switch 440 during the preheat cycle. No ICRECT signal will be applied to error amplifier 312 or flow out of the CRECT pin so as to charge capacitor 192.

Once ignition sweep begins, which immediately follows completion of the preheat cycle, the IGNST signal is at a high logic level. Switch 440 will now turn on and remain turned on during ignition sweep unless a overvoltage minimum threshold (e.g. about ½ the maximum voltage which will be applied to lamp 85 during ignition) is detected by comparator 421. During ignition sweep, the switching frequency is decreasing resulting in an increase in voltage across lamp 85 and sensed lamp current. The magnitude of the ICRECT signal increases which charges capacitor 192 resulting in an increase in the voltage at the CRECT pin. At low dim levels, the voltage at the CRECT pin could equal the voltage at the DIM pin. Without further intervention, error amplifier 312 detecting no difference between these two voltages will prematurely close the feedback loop prior to successful ignition of lamp 85.

To avoid the premature closure of the feedback loop, gate 439 during ignition sweep will turn off switch 440 and maintain switch 440 turned off for as long as an overvoltage minimum threshold condition exists as detected by comparator 421. By blocking the ICRECT signal from reaching the CRECT pin, the CRECT pin voltage drops and is thereby prevented from equaling the DIM pin voltage even when the latter is set to a deep dim level. Accordingly, the feedback loop cannot close during ignition sweep and thereby cannot prevent successful ignition from taking place. Preferably, switch 440 is turned off only once during ignition sweep beginning when the lamp voltage reaches the overvoltage minimum threshold and continuing until lamp 85 ignites. While switch 440 is turned off, capacitor 192 can sufficiently discharge through resistor 195 to ensure that the feedback loop will not prematurely close during ignition sweep.

Conventional ballast driving schemes in order to provide for successful lamp start-up supply a relatively high level of power to the lamp for an undesirably long period of time (e.g. up to several seconds). When attempting to start a lamp at a relatively low level of brightness, the undesirably long period of time at which the relatively high level of power is supplied to the lamp can result in a condition referred to as ignition flash. Under this condition, a momentary flash of light, potentially far brighter than desired, occurs.

In accordance with the invention, ignition flash has been substantially eliminated, that is, has been so minimized as to not be noticed. Substantial elimination of ignition flash has been achieved by avoiding the undesirably long period of time at which the relatively high level of power is supplied to lamp 85. More particularly, lamp 85 is supplied with a relatively high level of power for about 1 millisecond or less before being reduced in magnitude following lamp ignition. This immediate reduction in lamp power is achieved by monitoring overvoltage conditions and particularly when the lamp voltage drops below the overvoltage minimum threshold (as determined by comparator 421) before permitting switch 440 to close again. This drop in lamp power below the overvoltage minimum threshold occurs immediately upon successful ignition of lamp 85. In other words, at substantial dimming levels where ignition flash can occur, the latter is avoided by first detecting when the lamp voltage has been reached and/or exceeded the overvoltage minimum threshold and subsequent thereto when the lamp voltage has dropped below the overvoltage minimum threshold.

The output of comparator 424 assumes a high logic level when the lamp voltage exceeds the overvoltage maximum threshold (e.g. two times the overvoltage minimum threshold). When the output of comparator 424 is at a high logic level without detection of the near capacitive mode, switch capacitor integrator 327 increases the oscillating frequency of VCO 318 and therefore the switching frequency at a fixed rate (e.g. at a sweep rate of 10 kHz/millisec) based on the Q output of a D-type flip-flop 445 assuming a high logic level (i.e. signal FI (frequency increase) outputted by flip-flop 445 being at a high logic level). The time interval of the switching period of inverter 60 is therefore reduced. When the output of comparator 424 is at a high logic level and a near capacitive condition is detected, switch capacitor integrator 327 increases the oscillating frequency of VCO 318 and therefore the switching frequency immediately (e.g. within 10 microseconds) to its maximum value (e.g. 100 kHz) based on the output of a NAND gate 442 assuming a high logic level (i.e. signal FSTEP (frequency step) outputted by NAND gate 442 assuming at a high logic level). The switching period of inverter 60 is reduced to its minimum time interval (e.g. 10 microseconds) in response to VCO 318 now at its maximum oscillating value.

The output of comparator 427 assumes a high logic level when the lamp voltage exceeds an overvoltage panic threshold (i.e. above the overvoltage maximum threshold). When the output of comparator 427 is at a high logic level, switch capacitor integrator 327 increases the switching frequency of VCO 318 immediately to its maximum value based on the output of a NAND gate 442 assuming a high logic level (i.e. signal FSTEP (frequency step) outputted by NAND gate 442 assuming a high logic level).

Gate Driving Circuit

Gate driving circuit 320 is well known in the art and is more fully described in U.S. Pat. No. 5,373,435. The description of the gate driving circuit in U.S. Pat. No. 5,373,435 is incorporated herein by reference thereto. Pins FVDD, G1, S1 and G2 of IC 109 correspond to nodes PI, P2, P3 and GL as shown in FIG. 1 of U.S. Pat. No. 5,373,435. Signals G1L and G2L shown in FIG. 3 herein correspond to the signals at terminal $IN_L$ and between a controller and level shifter when the upper drive DU is on in U.S. Pat. No. 5,373,435, respectively.

Supply regulator

A supply regulator 592 includes a bandgap regulator 595 which generates an output voltage of about 5 volts. Regulator 595 is substantially independent over a wide range of temperatures and supply voltage (VDD). The output of a Schmitt trigger (i.e. comparator with hysteresis) 598, referred to as the LSOUT (low supply out) signal, identifies the condition of the supply voltage. When the input supply voltage at the VDD pin exceeds a turnon threshold (e.g. 12 volts), the LSOUT signal is at a low logic level. When the input supply voltage at the VDD pin falls below a turn-off threshold (e.g. 10 volts), the LSOUT signal is at a high logic level. During startup, the LSOUT signal is at a high logic level which sets the output of a latch 601, referred to as a STOPOSC signal, to high logic level. VCO 318 in response to the STOPOSC signal assuming a high logic level stops VCO 318 from oscillating and sets the CF pin equal to the output voltage of bandgap regulator 595.

When the supply voltage at the VDD pin exceeds the turnon threshold, the LSOUT signal assumes a low logic level. The STOPOSC signal now assumes a low logic level. VCO 318 in response to the STOPOSC signal being at a low logic level will drive inverter 60 so as to oscillate at a switching frequency as described herein with a substantially trapezoidal waveform being applied to the CF pin. Whenever the VDD pin voltage drops below the turnoff threshold and the gate drive at pin G2 assumes a high logic level, VCO 318 stops oscillating. Switches 100 and 112 will be maintained in their nonconductive and conductive states, respectively.

The output of latch 601 also assumes a high logic level resulting in VCO 318 stopping to oscillate and assuming a standby mode of operation whenever the output of a NOR gate 604 assumes a high logic level. The output of NOR gate 604, identified as a NOIGN signal, assumes a high logic level when after elapse of the ignition period either an overvoltage condition across lamp 85 or a capacitive mode of inverter operation is detected. Either of these conditions will occur when lamp 85 is removed from the circuit. The overvoltage condition will occur when lamp 85 fails to ignite.

Multi-function Lamp Voltage Sensing Pin

The VL pin is used in regulating lamp power, protecting the lamp from overvoltage conditions and providing an output drive to differentiate between preheat and normal regulation. The input to the VL pin is a current proportional to a lamp voltage (e.g. peak or rectified average). The VL pin current is coupled to multiplier 306 which produces a signal representing the product of lamp current and lamp voltage and, as discussed above, used for regulating lamp power. The VL pin current is also coupled to comparators 421, 424 and 427 for detecting overvoltage conditions. There is no need to regulate lamp power during the preheat cycle, however, since no full arc discharge yet exists within lamp 85. During the preheat cycle, inverter 60 operates at a much higher frequency than the resonant frequency of the unloaded LC tank circuit of inductor 75 and capacitor 80. This much higher frequency during the preheat cycle results in a relatively low voltage across lamp 85 which will not damage the components within ballast 10 or lamp 85.

During the preheat cycle, P-channel MOSFET 331 is turned on and N-channel MOSFET 332 is turned off so that the VL pin is at the same voltage potential as the VDD pin. The VL pin is therefore at a high logic level during the preheat cycle and at a low logic level otherwise (e.g. during ignition and steady state conditions). These two different logic levels at the VL pin identify whether inverter 60 is operating in a preheat or non-preheat mode of operation.

The high logic level at the VL pin during the preheat cycle turns on N-channel MOSFET switch 82. Capacitor 81 is now in parallel with capacitor 80. The addition of capacitor 81 lowers the unloaded resonant frequency resulting in a lower voltage being applied across lamp 85 during preheat. Once the preheat cycle has elapsed, switch 82 is turned off by the low logic level at the VL pin. Capacitor 81 is now no longer in parallel with capacitor 80. The unloaded resonant frequency rises and now can be more readily approached during the ignition sweep. Sufficiently high voltages can be applied across lamp 85 for igniting the latter.

During the preheat cycle, IC 109 does not need to sense the voltage across lamp 85 as represented by the voltage at the VL pin. The VL pin is therefore used during the preheat period to drive switch 82 into conduction. After the preheat cycle, overvoltage conditions and lamp power need to be monitored which require sensing of the lamp voltage as reflected by the voltage at the VL pin. The voltages at the VL pin are now at a low logic level and typically range between about 0 and 800 millivolts which permits switch 82 to be turned off. Therefore, the logic level at the VL pin, which reflects whether IC 109 is operating in the preheat mode or not, controls the arrangement of the resonant tank circuit. The VL pin can also be used to control the switching of other components external to IC 109 in and out of operation to affect the performance of inverter 60 or lamp 85 during and after the preheat state.

Capacitive Mode Protection

Inverter 60 is in a capacitive mode of operation when the current flowing through inductor 75 leads in phase the voltage across switch 112. In the near capacitive mode, current flowing through inductor 75 lags slightly behind but is within a predetermined interval of time (e.g. typically about 1 micro second) of the voltage across switch 112. In other words, the current flowing through inductor 75 lags within a predetermined phase difference behind the voltage across switch 112.

To move the switching frequency of inverter 60 away from entering into and if already within then as quickly as possible away from the capacitive mode of operation, lamp current is compared to a different one of two gate voltages every ½ cycle of one inverter switching period in determining the phase difference. In contrast thereto, conventional capacitive mode protection schemes do not distinguish between capacitive and near capacitive modes of operation and therefore either over compensate or under compensate when such modes are detected.

Capacitive mode conditions can be entered into very quickly when, for example, lamp 85 is removed from load 70. Damage to the switching transistors (e.g. switches 100 and 112) can occur rapidly once in the capacitive mode and often can not be avoided through the conventional protection scheme.

In accordance with the invention, the near capacitive mode condition is determined by monitoring the sign of the voltage waveform at the RIND pin during the leading edge of each gate pulse drive produced at pins GI and G2. Once both the near capacitive mode of operation and the overvoltage maximum threshold are detected, CCO 318 increases immediately (e.g. within 10 microseconds) to its maximum value.

The capacitive mode condition is determined by monitoring the sign of the voltage waveform at the RIND pin during the trailing edge of each gate pulse drive produced at pins G1 and G2, respectively. Once the capacitive mode of operation is detected, CCO 318 increases immediately (e.g. within 10 microseconds) to its maximum value so as to ensure that inverter 60 is operating within an inductive mode, that is, with the voltage developed across switch 112 during its nonconductive state leading in phase over the current flowing through inductor 75. The maximum oscillating (switching) frequency should be well above the unloaded resonant frequency. Typically, the maximum frequency of CCO 318 (i.e. minimum time interval of the switching period) is set equal to the initial operating frequency of inverter 60 (e.g. 100 kHz).

Reproducibility

Figure 4:
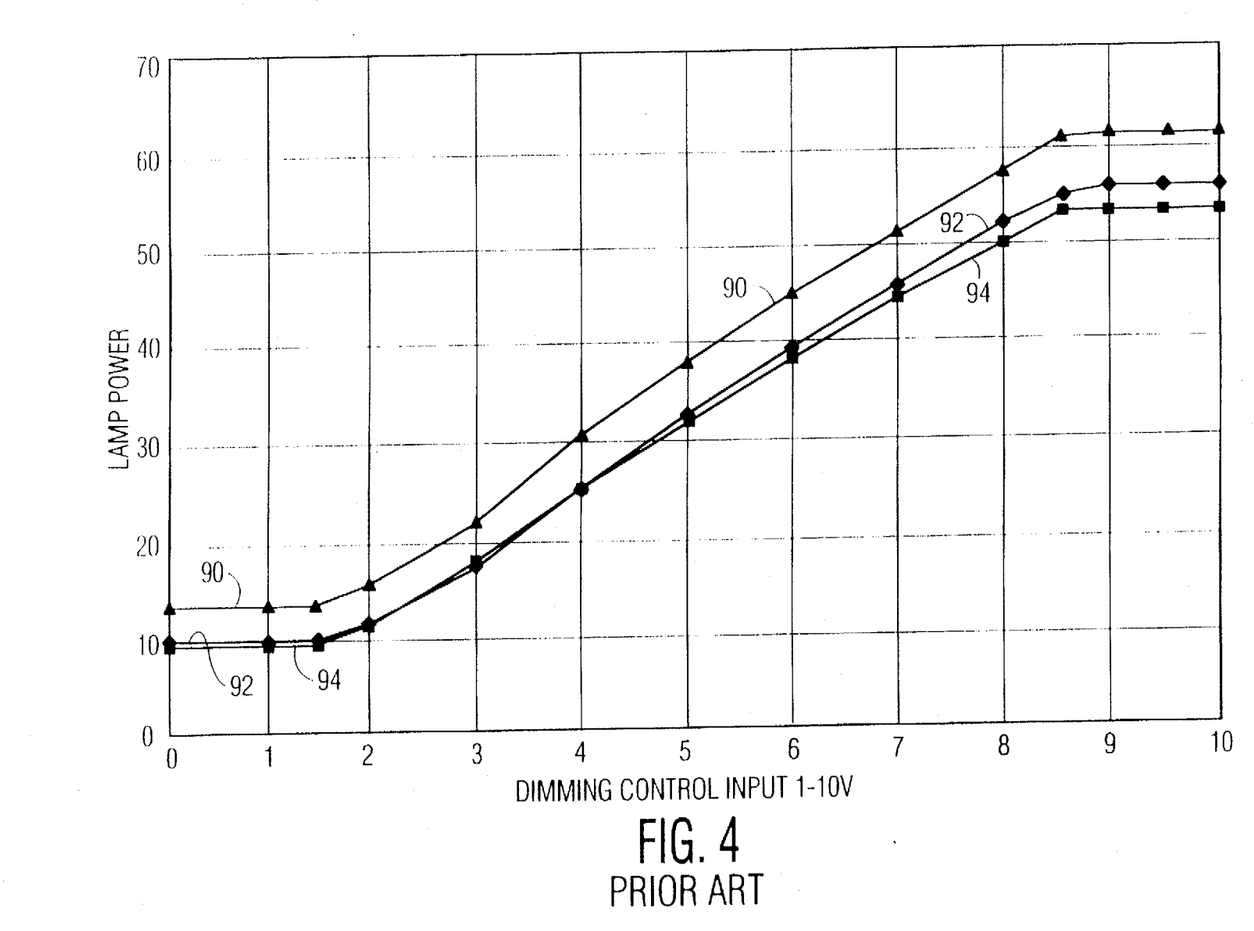
FIG. 4 are plots of lamp power versus dimming control input voltage for different lamps in accordance with a conventional ballast.

Referring now to FIG. 4, a plot of lamp power versus dimming control input particularly illustrates the non-reproducibility of conventional ballast driving schemes. A plurality of curves 90, 92 and 94 represent fluorescent lamps with different inert gases and/or of different diameters. For the same dimming control input voltage curves 90 and 92 or curves 90 and 94 will be at substantially different lamp powers. Reproducibility of desired lighting conditions for different types of lamps powered by the same ballast cannot be consistently and reliably achieved for the same dimming control input. Furthermore, none of these conventional ballast driving schemes can be well regulated at deep dimming levels, that is, down to 1% to 3% of full lamp output. Rather, each of these three lamps can go no lower than about 20% of full lamp output.

Figure 5:
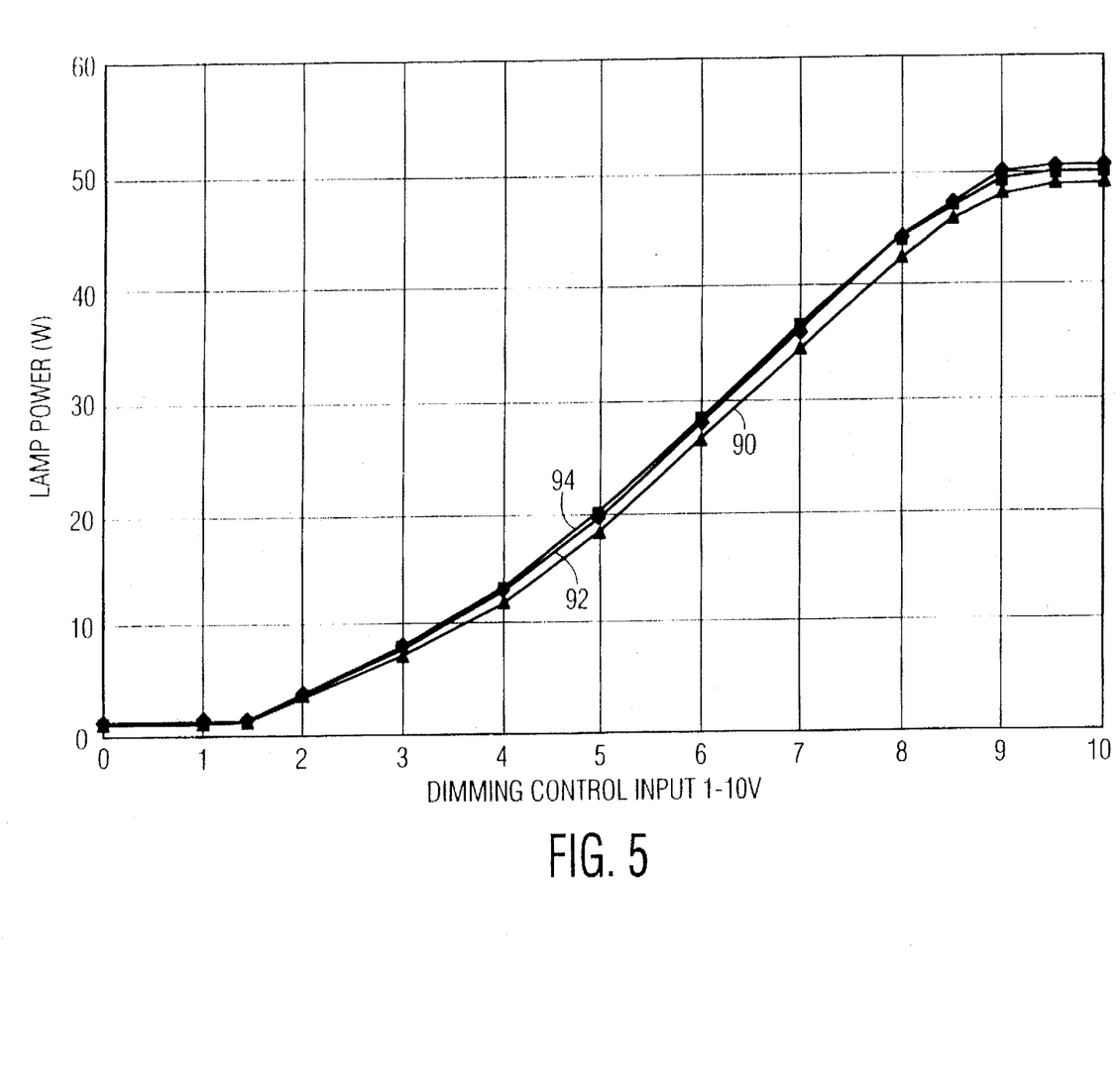
FIG. 5 are plots of lamp power versus dimming control input voltage for different lamps in accordance with the invention.

In contrast thereto, as shown in FIG. 5, the present invention provides both excellent reproducibility and deep dimming levels which can be easily regulated. For the same dimming control input voltage all three curves will be at substantially the same lamp power for the same dimming control input. All three lamps can also be driven into deep dimming levels, that is, down to about 1% of full lamp output. Furthermore, each of the curves is substantially linear making it relatively easy to regulate lamp power at deep dim levels.

As now can be readily appreciated, regulation is available for light levels as low as about 1% to 3% of full light output. Regulation at such deep dim light levels is provided through a relatively linear relationship between the external dim control signal and lamp power. Ballast 10 also powers different types of lamps at substantially the same level of light output, that is, provides reproducibility of desired lighting conditions for different types of lamps. Such regulation and reproducibility is achieved by driving the inverter based on actual lamp power consumption rather than on a conventional driving scheme which merely approximates lamp power consumption.

It will thus be seen that the objects set forth above and those made apparent from the preceding description are efficiently attained and, since certain changes can be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

We claim:

1. An inverter for powering a load having a lamp, comprising:
   switching means responsive to driving signals for switching into conductive and nonconductive states whereby power is delivered to the load such that a voltage is applied to and current flows through the lamp; and
   control circuitry for producing the driving signals based on a lamp power signal and including a multiplier for generating the lamp power signal which is proportional to the product of lamp current and lamp voltage.

2. The inverter of claim 1, wherein the control circuitry further includes an amplifier for comparing a feedback voltage based on the lamp power signal to a varying voltage representing a desired level of lamp power within a range from a minimum dim level to maximum brightness at full lamp power.

3. The inverter of claim 2, wherein the feedback voltage reflects the combination of the lamp power signal and a D.C. offset.

4. The inverter of claim 3, wherein the D.C. offset is a fixed value based on the minimum level of power desired for the lamp.

5. The inverter of claim 4, wherein the control circuitry is formed on an integrated circuit and further including the serial combination of a D.C. voltage source and resistive voltage divider network external to the integrated circuit for establishing the level of the D.C. offset and coupled through a pin of the integrated circuit to the multiplier, the voltage at the pin serving as the feedback voltage.

6. The inverter of claim 2, wherein only one or more linear relationships exist both between the varying voltage throughout the range and the lamp power signal and between the lamp power signal and power consumed by the lamp such that only one or more linear relationships exist between the varying voltage throughout the range and power consumed by the lamp.

7. The inverter of claim 6, wherein substantially the same one or more linear relationships exist for different lamps of the fluorescent type.

8. The inverter of claim 2, wherein a single linear relationship exists both between the varying voltage throughout the range and the lamp power signal and between the lamp power signal and power consumed by the lamp such that a single linear relationship exists between the varying voltage throughout the range and power consumed by the lamp.

9. The inverter of claim 8, wherein substantially the same linear relationship exists for different lamps of the fluorescent type.

10. A method for controlling the power delivered by an inverter to a load having a lamp, comprising:
    switching a pair of transistors configured in a totem pole arrangement into conductive and nonconductive states in response to driving signals whereby power is delivered to the load such that a voltage is applied to and current flows through the lamp; and
    producing the driving signals based on a lamp power signal generated by a multiplier, the lamp power signal being proportional to the product of lamp current and lamp voltage.

11. The method of claim 10, further including comparing a feedback voltage based on the lamp power signal to a varying voltage representing a desired level of power for the lamp within a range from a minimum dim level to maximum brightness at full lamp power.

12. The method of claim 11, wherein the feedback voltage reflects the combination of the lamp power signal and a D.C. offset.

13. The method of claim 12, further including fixing a predetermined value to the D.C. offset based on the minimum level of power desired by the lamp.

14. The method of claim 12, wherein the multiplier is formed on an integrated circuit and further coupling the D.C.

offset through a pin of the integrated circuit to the multiplier, the voltage at the pin serving as the feedback voltage.

15. The method of claim 12, further including establishing only one or more linear relationships both between the varying voltage throughout the range and the lamp power signal and between the lamp power signal and power consumed by the lamp such that one or more linear relationships exist between the varying voltage throughout the range and power consumed by the lamp.

* * * * *